(12) United States Patent
Smyth et al.

(10) Patent No.: US 10,070,322 B2
(45) Date of Patent: Sep. 4, 2018

(54) DYNAMIC FREQUENCY PLANNING IN SHARED SPECTRUM

(71) Applicant: Cable Television Laboratories, Inc., Louisville, CO (US)

(72) Inventors: Peter Smyth, Suffolk (GB); Mark Poletti, Louisville, CO (US); James O'Connor, Louisville, CO (US)

(73) Assignee: Cable Television Laboratories, Inc., Louisville, CO (US)

( * ) Notice: Subject to any disclaimer, the term of this patent is extended or adjusted under 35 U.S.C. 154(b) by 0 days.

(21) Appl. No.: 15/883,974

(22) Filed: Jan. 30, 2018

(65) Prior Publication Data

US 2018/0220306 A1    Aug. 2, 2018

Related U.S. Application Data

(60) Provisional application No. 62/452,043, filed on Jan. 30, 2017.

(51) Int. Cl.
*H04W 72/00* (2009.01)
*H04W 16/14* (2009.01)

(52) U.S. Cl.
CPC ............................. *H04W 16/14* (2013.01)

(58) Field of Classification Search
CPC .................................................. H04W 16/14
USPC ............................................................ 455/454
See application file for complete search history.

(56) References Cited

U.S. PATENT DOCUMENTS

2012/0071102 A1\* 3/2012 Palomar ............... H04W 16/14
                                                                455/63.1
2017/0142736 A1\* 5/2017 Liu ....................... H04W 16/14
2017/0318474 A1\* 11/2017 Farshchian ............ G01S 7/021

\* cited by examiner

*Primary Examiner* — Charles Shedrick
(74) *Attorney, Agent, or Firm* — Great Lakes Intellectual Property, PLLC.

(57) ABSTRACT

Dynamic frequency planning of shared spectrum is contemplated. The sharing may facilitate use of unlicensed or non-exclusively licensed spectrum within a geographical area service by two or more spectrum access sharing systems (SASs) or otherwise subjected to control of independently operating entities.

1 Claim, 1 Drawing Sheet

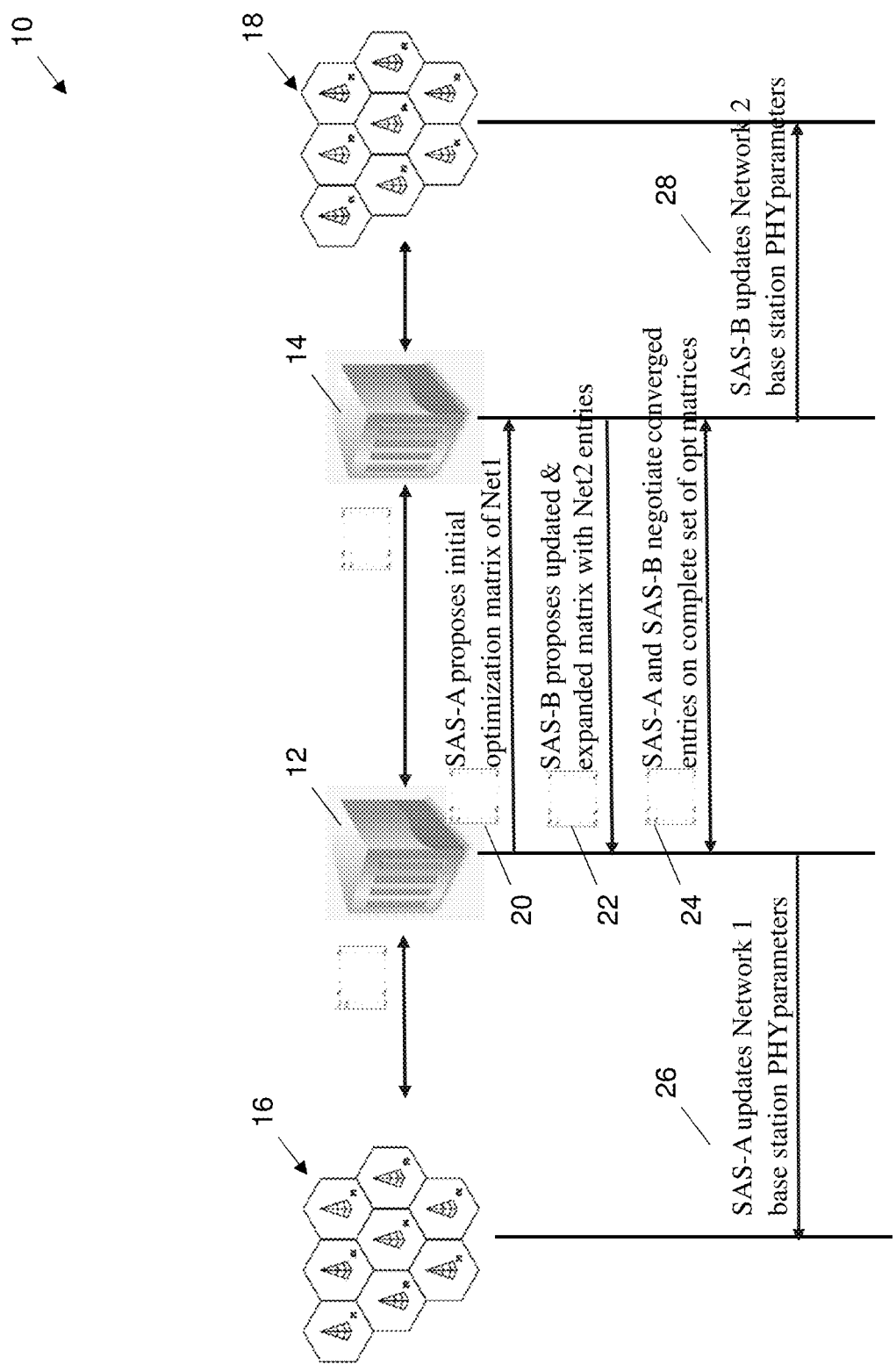

DYNAMIC FREQUENCY PLANNING IN SHARED SPECTRUM

CROSS-REFERENCE TO RELATED APPLICATIONS

This application claims the benefit of U.S. provisional application No. 62/452,043 filed Jan. 30, 2017, the disclosure of which is incorporated in its entirety by reference herein.

TECHNICAL FIELD

The present invention relates to dynamic frequency planning of shared spectrum, such as but not necessarily limited to facilitating use of unlicensed or non-exclusively licensed spectrum within a geographical area service by two or more spectrum access sharing systems (SASs).

BACKGROUND

New non-exclusively licensed shared spectrum paradigms mean that frequency plans need to work across independent network operators. Certain operators may have higher priority than others, which has implications for frequency plans. Mobile incumbents or priority networks may appear or move within the area, forcing dynamic frequency planning updates. Different networks in these bands, such as LTE-TDD and 3GPP LAA, will need either guard bands between networks to reduce interference, or they will need a central frequency plan coordination across operators to reduce guard bands. Since guard bands are inefficient, central coordination is preferred. What is needed is centralized method to dynamically optimize inter-operator frequency plans in shared spectrum.

BRIEF DESCRIPTION OF THE DRAWINGS

FIG. 1 illustrates a diagram for facilitating frequency sharing of non-exclusively licensed spectrum in accordance with one non-limiting aspect of the present invention.

DETAILED DESCRIPTION

As required, detailed embodiments of the present invention are disclosed herein; however, it is to be understood that the disclosed embodiments are merely exemplary of the invention that may be embodied in various and alternative forms. The FIGURES are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

FIG. 1 illustrates a system 10 for facilitating frequency sharing of non-exclusively licensed spectrum in accordance with one non-limiting aspect of the present invention. While applicable to other environments utilizing other bands of unlicensed or shared spectrum, the system 10 may be configured to facilitate implementing wireless signaling suitably compliant with the Citizens Broadband Radio Service for shared wireless broadband use of the 3550-3700 MHz band (3.5 GHz Band) as adopted by the U.S. Federal Communications Commission (FCC). The Citizens Broadband Radio Service is governed by a three-tiered spectrum authorization framework to accommodate a variety of commercial uses on a shared basis with incumbent federal and non-federal users of the band.

Incumbent Access users include authorized federal and grandfathered Fixed Satellite Service users operating in the 3.5 GHz Band. These users will be protected from harmful interference from Priority Access and General Authorized Access users. The Priority Access tier consists of Priority Access Licenses (PALs) that will be assigned using competitive bidding within the 3550-3650 MHz portion of the band. Each PAL is defined as a non-renewable authorization to use a 10 megahertz channel in a single census tract. The General Authorized Access (GAA) tier is licensed-by-rule to permit open, flexible access to the band for the widest possible group of potential users. GAA users are permitted to use any portion of the 3550-3700 MHz band not assigned to a higher tier user and may also operate opportunistically on unused Priority Access channels.

One non-limiting aspect of the present invention contemplates facilitating dynamic frequency sharing between a first spectrum access sharing system (SAS) 12 and a second SAS 14. The first and second SASs 12, 14 or other suitable controllers may be responsible for independently and respectively controlling a first plurality of access points (APs—shown with towers) 16 and a second plurality of APs 18. The first and second APs 16, 18 may be co-located or otherwise positioned within relative proximity such that unlicensed or shared spectrum wireless signaling associated therewith (shown with hexagons) overlaps such that a user device (not shown) within either one of a first network associated with the first plurality of APs 16 and a second network associated with the second plurality of APs 18 may receive wireless signals associated with both of the first and second networks. The SASs 12, 14 may include a non-transitory computer-readable medium having a plurality of instructions executable with an associated processor to facilitate sharing the unlicensed spectrum available to the first and second APs 16, 18.

The sharing of spectrum, particularly unlicensed spectrum or other signaling being commonly shared across independently controlled entities, e.g., within the 3.5-3.7 GHz range or 3.5 GHz band, is believed to be beneficial in avoiding interferences and/or other signaling degradations when multiple APs 16, 18 may be attempting to contemporaneously use the unlicensed or shared spectrum within a common geographical area. The sharing of frequency/spectrum may be facilitated with optimization matrices (shown as squares) and/or related data being shared between the SASs 12, 14 for purposes of determining an optimized usage of the shared spectrum across all users, e.g., incumbent users, PAL users and GAA users. The optimization matrices may be files, extensible markup language (XML) schema, documents or other constructs sufficient for communicating information between the SASs 12, 14. The SASs 12, 14 may analyze the matrices being exchanged to determine an optimized set of operating characteristics and parameters for the first and second APs 16, 18 or additional APs within the control thereof or control of another SAS so as to maximize access, usage, throughput, quality of service (QoS) or other features of the first and second networks through coordinated usage of shared spectrum, which may optionally be performed in a manner that equally favors all users within the three-tiered hierarchy.

The SASs 12, 14 may be configured to generate, share and process optimization matrices having entries sufficient for reflecting characteristics of the APs 16, 18 associated therewith, which may include representing one or more of the following: path loss; interference levels; mutual coupling between directional antennas; available channels at the APs 16, 18; technology standard deployed at each AP 16, 18; and/or location of the APs 16, 18. The SASs 12, 14 may then use this and/or other information shared or known to cooperatively negotiate frequency/channel assignment, time domain duplex (TDD) frame configuration, transmit power, beamforming and/or other capabilities of the APs 16, 18 to form a shared matrix or complete set of matrices encompassing all APs 16, 18 and settings for each. The SASs 12, 14 may negotiate in this manner to achieve the most bits transmitted in a geographic area with suitable constraints to accommodate incumbents and higher priority networks and/or to achieve other desired operating states for some or all of the geographical areas subject to shared spectrum overlap. The shared matrix and/or the complete set of optimized matrices may be dynamically updated for: mobile incumbents; base stations that enter or leave the area; changes in propagation conditions affecting path loss between base stations.

The informational exchange between the SASs 12, 14 may include: a process 20 where the first SAS 12 proposes an initial optimization matrix for the first network; a process 22 where the second SAS 14 proposes an update to the initial optimization matrix according to preferences/needs of the second SAS along with an expanded matrix for the second network; and a process 24 where the first and second SASs 12, 14 then negotiate converged entries, i.e., merging or integrating the exchanged matrices to create the shared matrix or complete set of matrices optimized according to an agreed upon performance metric for the first and second networks individually and/or in totality, i.e., overall performance when viewed from a combined operation point of view. Each of the SASs 12, 14 may then execute processes 26, 28 associated with updating and/or otherwise configuring the associated APs 16, 18 according the shared matrix, such as by configuring the PHY parameters, e.g., frequency or frequencies to be used at each AP 16, 18, for the first and second networks through suitable instructions and commands.

The SASs 12, 14 may share information in the contemplated manner to facilitate: use of a centrally coordinated optimization platform across multiple independent mobile network; use of an optimization matrix or set of optimization matrices to represent a set of independent network base stations; optimization matrix entries and algorithms with weights that reflect priority users and priority user protection zones; a centralized optimization coordinator to update the PHY parameters of multiple independent networks for overall increased capacity and performance in the shared spectrum area; dynamically updating the shared matrix as incumbent events are detected, base stations are added or deleted and/or as propagation condition changes are detected between APs; frequency planning across multiple independent networks with frequency reuse >1; frequency planning across multiple independent networks with frequency reuse=1, including joint use of LTE ICIC across independent networks in an optimized plan; the ability for multiple SASs to negotiate a single optimized matrix or set of matrices that represent the superset of networks in each area of each SAS where each SAS can propose a partial matrix solution that reflects their networks with their view of their optimization for their networks and/or each SAS can respond with a more complete matrix that adds entries for its networks with its preferred optimization solution; superset optimization updates may be proposed by the SAS or SASs that detect an incumbent event; and/or superset optimization updates are proposed by the SAS that detects a base station being added or deleted from any the networks.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method for dynamic frequency planning of shared spectrum, the shared spectrum being utilized by a plurality of access points (APs) within an overlapping geographical area to facilitate wireless signaling, a first plurality of the plurality of APs being controlled with a first spectrum access sharing system (SAS) and a second plurality of the plurality of APs being controlled with a second SAS, the method comprising:

transmitting a first optimization matrix from the first SAS to the second SAS, the first optimization matrix representing operating characteristics for the first plurality of APs;

receiving an updated optimization matrix and a second optimization matrix from the second SAS, the update optimization matrix including proposed changes to the first optimization matrix, the second optimization matrix representing operating characteristics for the second plurality of APs; and negotiating between the first SAS and the second SAS based on the first, second and updated optimization matrices to converge each into a shared matrix, the shared matrix sufficient for the first SAS and the second SAS to set physical layer (PHY) parameters associated with frequency usage within the shared spectrum for the first and second APs controlled thereby.

* * * * *